United States Patent Office 3,508,454
Patented Apr. 28, 1970

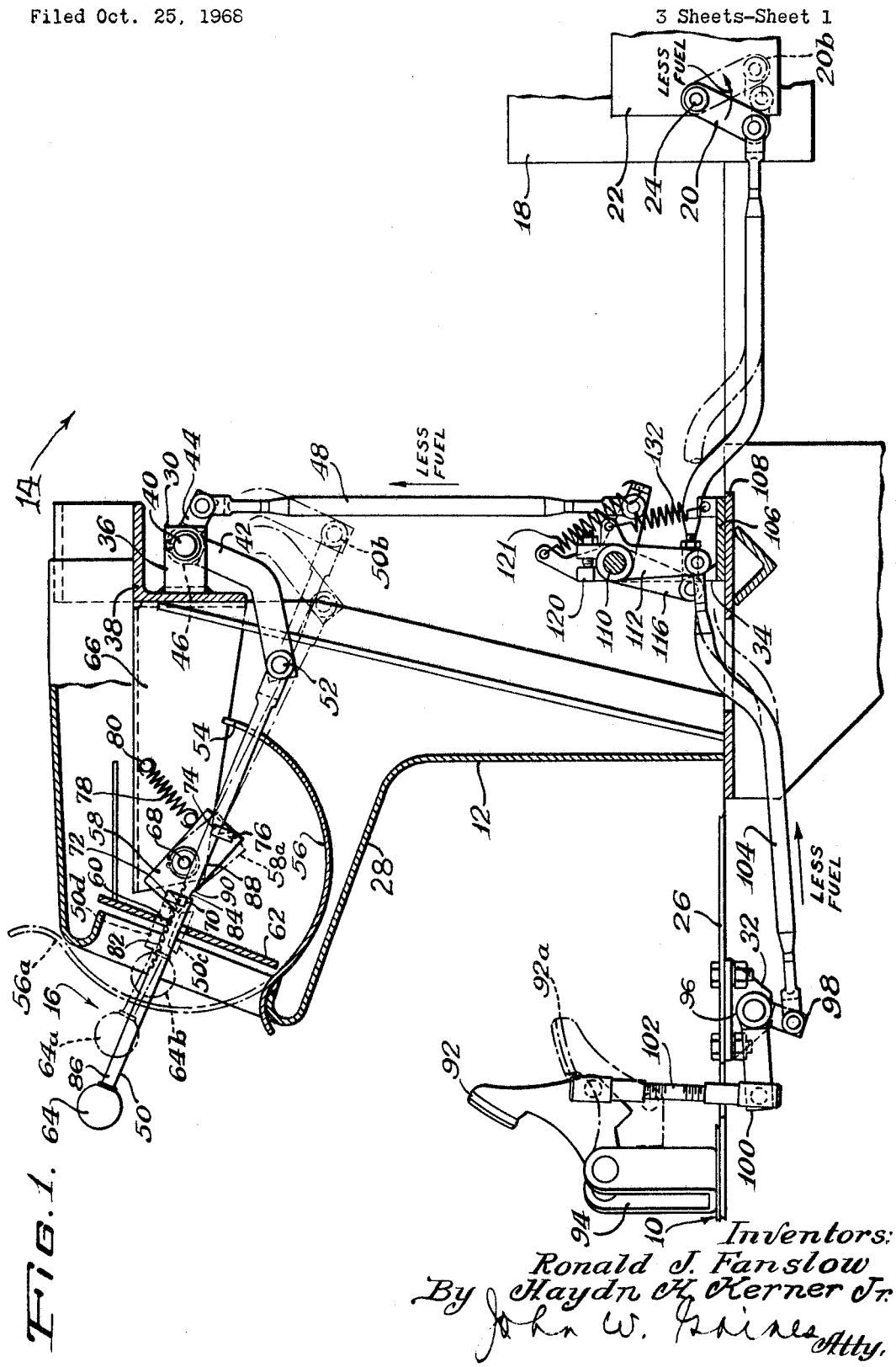

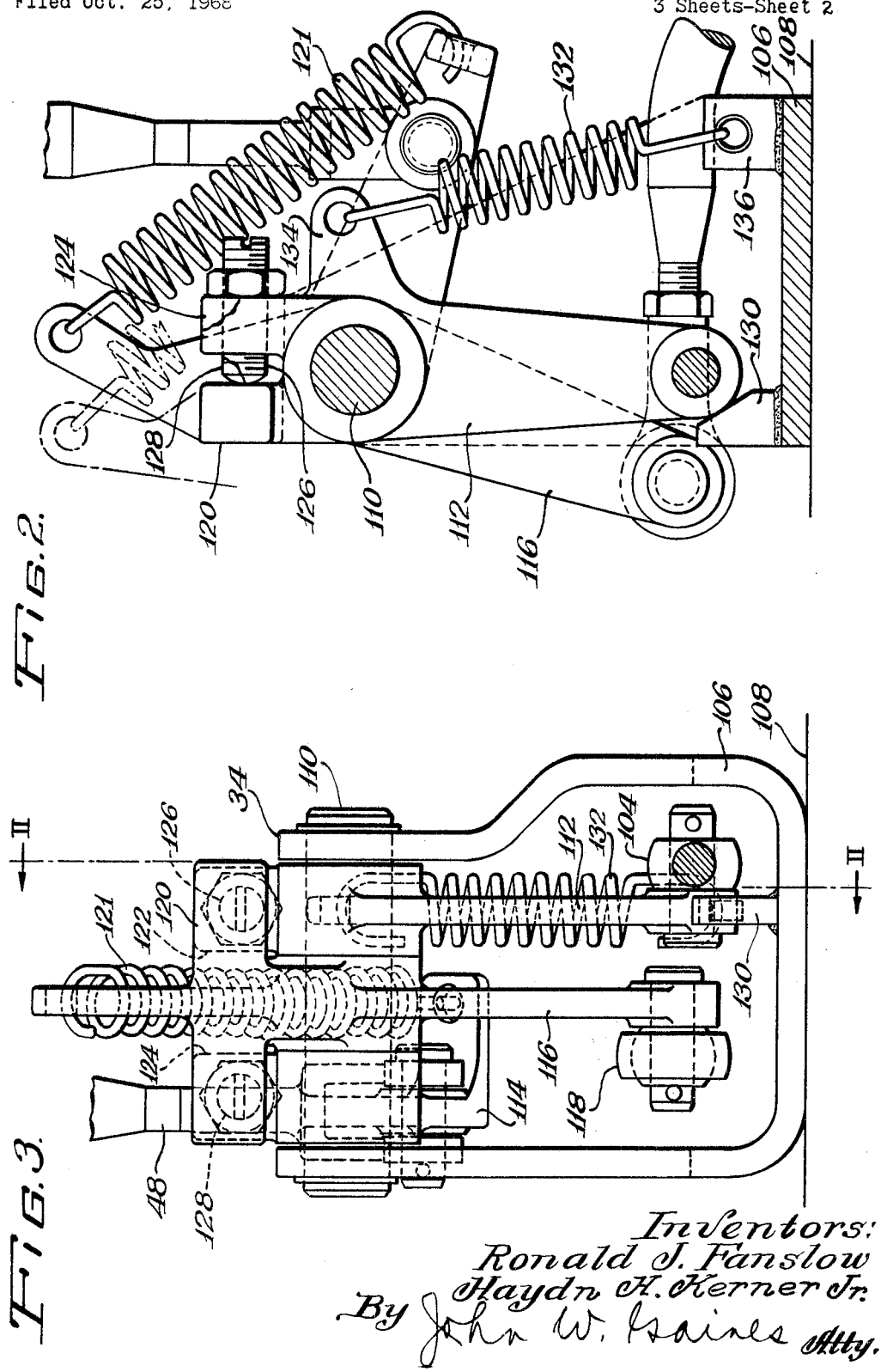

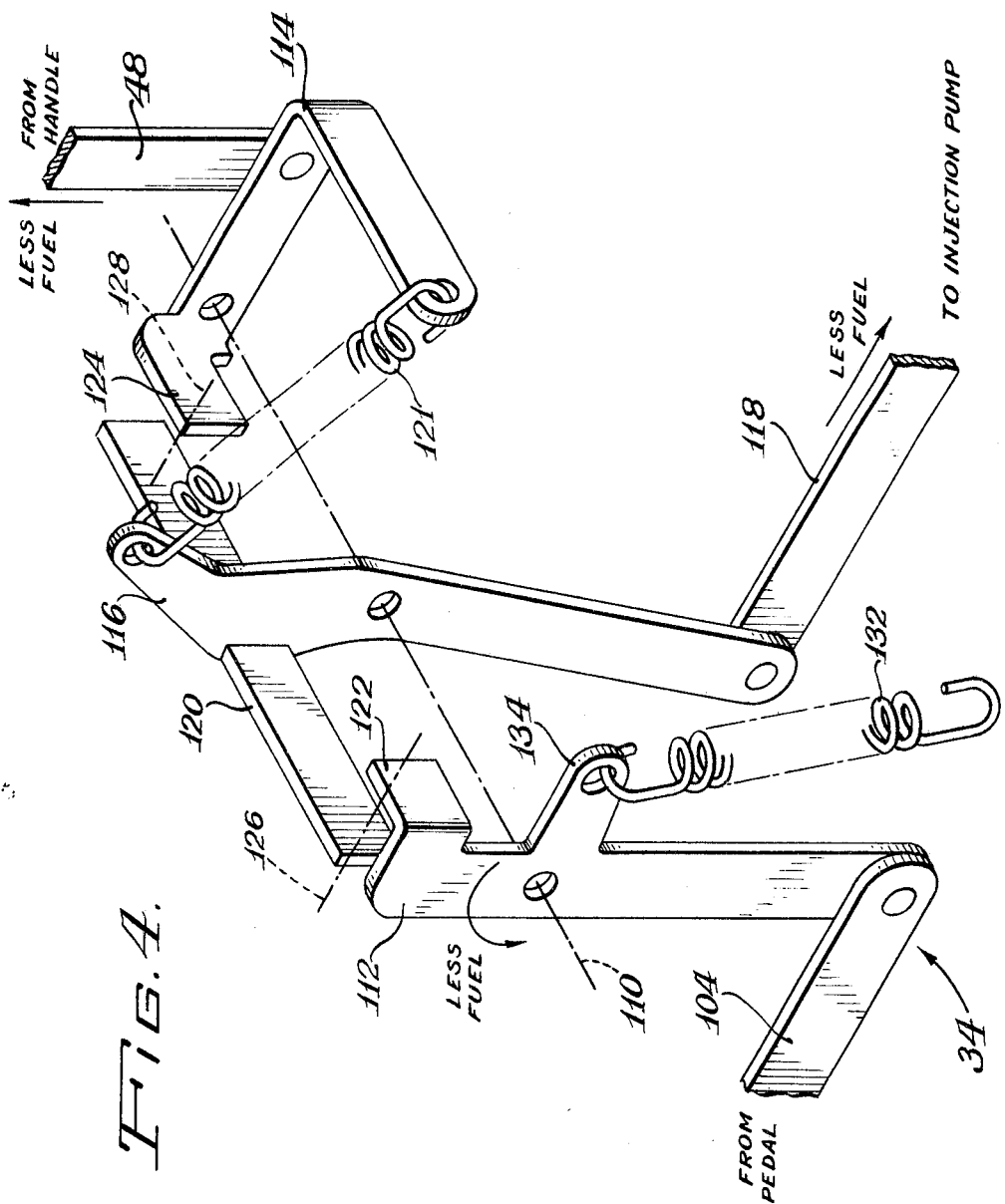

3,508,454
OPERATOR'S PUSH-PULL LINKAGE TO SET ENGINE SPEED
Ronald J. Fanslow, Palatine, and Haydn H. Kerner, Jr., Glendale Heights, Ill., assignors to International Harvester Company, Chicago, Ill., a corporation of Delaware
Filed Oct. 25, 1968, Ser. No. 773,361
Int. Cl. G05g 11/00
U.S. Cl. 74—482                                22 Claims

ABSTRACT OF THE DISCLOSURE

An operator's push-pull linkage for controlling the speed setting of an engine fuel control, having a knob-operated control rod or rack, a series of notches and a smooth portion formed on the upper side of the rack, a notch and a smooth portion formed on the lower side of the rack, and a dual pawl plate slidably receiving the rack for axial motion and shiftable to accommodate limited transverse displacement of the rack in opposite directions. The upper notches receive one pawl of the plate in power settings of the rack, the lower notch receives another pawl in an idle setting of the rack, and transverse displacement of the rack in one of the two opposite directions unlatches the other pawl from the idle notch enabling the rack to slide to an engine off position.

---

A push-pull rack for setting an engine fuel control operates problem-free during speed increases of the engine, causing the latter to accelerate to higher speed in proportion to the magnitude of the extending length of the rack as it is drawn out. The problem arises during extensive speed decreases because retraction of the rack by pushing it back will, if unchecked, move the rack and control past engine idle and inadvertently into the engine shut-off position. We have discovered that this drawback can be overcome by requiring the operator to make conscious effort at the point of reaching engine idle if, at that point, he actually desires to continue pushing and shut off the engine altogether by causing farther retraction of the rack.

That is to say, a fuel control setting rack provided according to our invention will overcome the foregoing problem because it requires the operator, upon decelerating the engine to an automatically re-latched point at which idle speed is reached, to transversely move the rack by hand in a distinctive direction so that he can unlatch it and thereafter be able to push the rack to engine shut-off position, as will now be explained in detail. Features, objects, and advantages of our invention will either be specifically pointed out or become apparent when, for a better understanding thereof, reference is made to the accompanying drawings in which a preferred embodiment is shown and in which:

FIGURE 1 shows, in right side elevational view, the upper mid-portion of an engine-powered vehicle embodying our invention;

FIGURE 2 shows a detail (out put linkage) of FIGURE 1 in the same position as there shown but to enlarged scale, FIGURE 2 being taken along the section lines II—II of FIGURE 3;

FIGURE 3 is an elevational view of the out put linkage detail of FIGURE 2 as viewed from the rear; and FIGURE 4 shows the out put linkage detail of FIGURES 2 and 3 schematically, as viewed isometrically from the front.

More particularly in a crawler tractor vehicle as indicated at 10 in the drawings, a generally upstanding dash panel 12 is shown separating a vehicle engine compartment 14 at its rear from the front end of an adjacent operator's compartment 16.

A diesel engine 18 in the vehicle engine compartment 14 is provided with a depending fuel control link 20 or, more specifically, with a fuel injection pump 22 which carries the link 20 on a shaft 24 projecting from the pump. When the control link 20 moves in a counterclockwise direction as shown by an arrow, it reduces the fuel system flow to a high idle or low idle setting as selected, and ultimately to a shut-off setting in which the engine receives no fuel and stops running.

The operator of the vehicle controls the engine from the operator's compartment 16, which includes a platform 26 supporting the dash panel 12 and an instrument console housing 28 which is part of and is supported by the panel 12. Details of the tractor 10, dash panel 12, console 28 and its instruments, not shown, are set out in the same assignee's copending Fanslow et al. patent application Ser. No. 637,122 filed May 9, 1968, now Patent No. 3,452,835, the disclosure of which is incorporated in entirety herein by reference.

The operator manually controls the setting of the link 20 through a motion transmitting linkwork or train, by which the control link 20 is hand-operated from a primary input linkage 30 and foot-operated from a secondary input linkage 32. An intervening output linkage 34 common to the linkages 30 and 32 interconnects them with the fuel control link 20.

PRIMARY INPUT LINKAGE—FIGURE 1

A U-shaped bracket 36 forms one of the main supports for the primary input linkage 30 and is supported in the housing 28 by a horizontal cross member 38. The bracket 36 carries a pin 40 rotatably supporting a bell crank which includes an outer crank 42, an inner crank 44, and a common rocking sleeve 46 to which the respective cranks are rigidly affixed. A depending link 48 interconnects the free end of the inner crank 44 and the output link 34.

A generally fore and aft extending control rod or rack 50 in the housing 28 is pivoted at the inner end on a pin connection 52 carried at the free end of the outer crank 42. The rack 50 extends from the pin 52, through a short circumferential slot 54 in a hemi-cylindrical guard 56 which pivots into an instrument covering broken line position 56a, then alongside a latch plate 58, through a vertically elongated slot 60 in an instrument panel 62, and thence to an externally projecting position from the housing where the rack 50, at its projecting end, carries a knob forming an operator's handle 64.

The operator, by depressing the handle 64, slides the extending rack 50 from the position of the rack as shown in solid lines corresponding to a full power setting in the power range, through intermediate power range settings and through an idle setting corresponding to the broken line idle position of the handle as shown according to the broken lines 64a, and into an engine shut-off position indicated by the broken lines 50b corresponding to the engine shut-off position of the handle as shown by the broken lines 64b. Sliding in the direction described and vice versa is axial and is accomplished by push-pull action of the operator.

When the rack 50 is in the engine shut-off position corresponding to the broken line position of the handle as shown by the broken lines 64b, it is fully housed against access from the outside by means of the guard 56 in a guarding position at the front of the console housing 28. More importantly, the guard physically blocks extensible movement of the rack, preventing movement of the motion transmitting train into a power setting or idle position.

LATCHING STRUCTURE—FIGURE 1

A metal arm 66 within the housing 28 projects in the outward direction from and is fixed to the cross member 38. A pivot pin 68 carried by the arm 66 provides a common support for the guard 56 and the latch plate 58 which rock on a common horizontal cross axis thereabout. An upper lug on the near side of the plate 58 has a downwardly opening V or notch 70 receiving the rack 50 and is provided with a tapered pawl 72 at the base of the notch. A similar V or notch 74 and pawl 76 are provided on a lower lug on the near side of the plate 58 which receives the rack 50. Side movement of the rack is prevented by the sides of the notches.

The two lugs are on opposite sides of the axis of the pin 68. The plate 58 is biased into the unpivoted position as shown in solid lines by means of a diagonally disposed return spring 78 hooked at the lower end to the upper edge of the plate 58 on the inner side thereof and hooked at the upper end over a pin 80 fixed at that side to the arm 66.

Upper and lower notch means on an intermediate section of the rack 50 consist of a power range series of notches 82 and a single idle notch 84, the power range notches alternating with upstanding teeth in the rack and having an upper smooth rack portion 86 in the plane thereof and immediately there adjacent to the outside. The idle notch 84 has a lower smooth rack portion 88 in the plane thereof and merging thereinto by a ramp 90 on the inner side of the lower notch 84.

LATCHING AND UNLATCHING—FIGURE 1

In order to crank when the engine 18 is dead, the operator pulls the handle from the engine shut-off position as shown by the broken lines 64b to some point in the power range between the idle position as shown by the broken lines 64a and the full power position as shown in solid lines in FIGURE 1. A slight downward displacement of the rack 50 pivoting it at the lower end about the mounting connection 52 is desirable as a preliminary when extending the rack to an engine-starting power setting, the result being to pivot the plate 58 clockwise into the broken line position as shown by broken lines 58a.

The pulling movement is continuous as the rack 50 slides against the tooth of the pawl 76 which, in sequence, enters upwardly into the idle setting notch 84, then retracts downwardly as it is cammed along the ramp 90, and finally rides snugly against the sliding smooth portion 88 until the handle 64 is released. The return spring 78 forces the tooth of the upper pawl 72 into the selected one of the power range setting notches 82.

After the engine is started, the engine 18 is allowed a short warm-up, running at no load.

The operator sets the fuel link 20 by moving the rack 50 either from an existing power setting or the idle setting into the desired power setting. The handle 64 is pulled straight or is displaced downwardly and pulled, pivoting the plate 58 into the broken line position 58a so as to move the pawl 72 to an upwardly withdrawn unlatched position. The rack 50 is then axially latched in the proper power setting by release of the handle 64 which is then pivoted about the end mounting connection 52 from a lowered displaced position as shown by the broken lines 50c into the latched position shown by solid lines.

The idle setting wherein the pawl 76 engages the idle notch 84 is accomplished with a pushing motion when the rack occupies the broken line position 50c, and yet inadvertent engine shut-off is prevented. That is to say, as soon as the tooth of the pawl 76 rides along the ramp 90 into the idle setting notch 84, further pushing-in of the handle 64 is stopped by the pawl 76.

Although the active parts which serve as the means of forcing the plate 58 into the pivoted position differ depending upon the actual point of latching contact with the rack section, the plate is nevertheless always pivoted to about the same position to unlatch the rack 50.

From the idle setting, the operator must make a conscious opposite effort in order to shut off the engine, because of the deliberate alternate action arrangement herein provided. For engine shut-off, the operator displaces the rack 50 by pivoting it upwardly about the mounting connection 52 at the lower end into the transversely upwardly displace position as shown by the broken lines 50d wherein the smooth portion 86 cams the upper pawl 72 to pivot the plate into the position shown by the broken lines 58a, whereupon pushing-in motion on the handle 64 depresses the rack 50 to the dotted line shut-off position 50b because the tooth of the engaged pawl 76 has meantime been downwardly withdrawn from the idle setting notch 84.

SECONDARY INPUT LINKAGE—FIGURE 1

The operator controls the secondary input linkage by means of a decelerator pedal 92. The pedal 92 is pivotally supported at its rear end by an upstanding U-shaped bracket 94 on the platform 26 and is movable from a released position as shown in solid lines into a fully depressed, decelerating broken line position as shown by the broken lines 92a. A bell crank sleeve 96 is bracketed to the underside of the platform 26 and carries a depending arm 98 and a generally rearwardly extending arm 100. A depending link 102 is pivotally connected at its upper end to the underside of the pedal 92 and is pivotally connected at its lower end to the free end of the arm 100.

The free end of the depending crank arm 98 pivotally supports a fore and aft disposed link 104 extending forwardly to a point of connection with the output linkage 34.

The decelerator pedal and the handle operated rack have an important characteristic in common. Their operation calls for the same general reflex to associate itself in the mind of the operator, namely, that depression by pushing either to the normal depressed stopping point thereof causes immediate deceleration of the engine to idle.

OUTPUT LINKAGE—FIGURES 1, 2, 3, 4

A generally U-shaped upstanding bracket 106 for supporting the output linkage 34 is supported on the tractor frame 108 and carries, in an upwardly offset horizontal position, a fixed cross pin 110. The pin 110 rockably supports a pedal-connected side lik 112 secured at its midportion to the pin, a handle-connected side link 114 secured at its midportion to the pin, and a common link 116 secured at its midportion secured to the pin 110 and disposed between the two side links.

As viewed in FIGURES 1, 2, and 4, the common link 116 rocks with counterclockwise motion in a less-fuel direction to reduce the engine speed, and a fore and aft extending link 118 pivotally interconnects the bottom end of the common link 116 and the free bottom end of the control link 20 on the injection pump 22. The less-fuel direction is indicated by an arrow.

Two lateral wings 120 extending in opposite directions on the upper end of the common link 116 register with respective in-turned lugs 122 and 124 carried by the tops of the side links 112 and 114. The lugs 122 and 124 are selectively operated to engage the wings and rock the common link 116 counterclockwise.

TRAVEL AND OVER-TRAVEL

The depending link 48 is pivoted to the handle-connected side link 114 at a point on the latter spaced apart forwardly from the fixed cross pin 110. Full clockwise rotation of the side link 114 as viewed in FIGURE 4 to a position corresponding to full throttle produces a contrast of circumstances. A helical tension spring 121 connected between a lateral arm on the front of the side link 114 and an upstanding arm on the common link 116 causes the common link 116 to precisely duplicate the rocking of the side link 114 with no slack between the leading lug 124 and the following wing 120 on the common link 116. At the same time, an existing gap or space between the stationary lug 122 and the forwardly moving wing 120 diminishes but never entirely disappears and the pedal-connected side link 112 remains in the same retracted or released position.

Counterclockwise movement of the handle-connected side link 114 as viewed in FIGURE 4 causes the common link 116 to have precisely the same movement, the wing 120 of the latter separating farther and farther away from the lug 122 on the unmoved pedal-connected side link 112. The result of such counterclockwise movement is to decrease engine speed because of less fuel. The speed can thus be decreased to somewhere in the lower portion of the power range, or the idle, or to engine shut-off, all without disturbing the pedal-connected side link 112 in its released or restored position.

When the handle-connected side link 114 has a position corresponding to some point in the engine power range, counterclockwise movement of the pedal-connected side link 112 causes engagement between the lug 122 on that link and the registering wing 120 on the common link 116. Continued counterclockwise rotation is accommodated by tension spring 121 which stretches to allow the lug 124 and the registering wing 120 to physically separate. In being rotated counterclockwise, the common link 116 over-travels the handle-connected side link 114 without disturbing the latter, and takes a fast idle position corresponding to the broken line fully depressed decelerator position as shown by broken lines 92a in FIGURE 1.

For proper adjustment purposes, the lug 122 carries a lockable set screw 126 engaging the registrable wing 120, and the lug 124 carries a lockable set screw 128 engaging the registrable wing 120 on the common link 116.

In the fully depressed position of the decelerator pedal 92, the set screw 126 on the pedal connected link 112 is adjusted to cause the control link 20 to take a fast idle position, e.g., a position causing a governed engine speed in a range close to or including 1,000 r.p.m. Otherwise, the pedal 92 takes its fully released position, as limited by a stop 130 (FIGURE 2) upstanding in the path of the lower end of the pedal-connected link 112 and affixed to the bracket 106. A decelerator return spring 132 interconnects a frontwardly extending arm 134 on the pedal-connected side link 112 and an anchor lub 136 on the bracket 106 to maintain the link and stop 130 in contact.

When the rack occupies the idle position, the set screw 128 is adjusted relative to the lug 124 to set the control link 20 in a low idle position, e.g., a position causing a governed engine speed in a range close to or including 600 r.p.m. It is evident that the decelerator pedal cannot be depressed for adjusting the engine to its fast idle setting when the rack has the control link 20 in a low idle setting.

OVERALL OPERATION

Following start-up and warm-up of the engine 18 in the manner aforesaid, the operator pull the the rack 50 out to a desired power setting and commences work with the the tractor. Under transitory circumstances when the operator wishes to slow temporarily to approach a load or to slow temporarily for a crossing or approaching vehicle, he depresses the decelerator pedal 92 and, when the transitory condition has passed, he releases the pedal and the engine resumes speed, with none of the movements disturbing the setting of the rack 50. In other words, release of the declerator pedal enables bias in the tension spring 121 (FIGURE 4) to immediately restore the common link 116 to its former position against the handle-connected side link 114, and the decelerator return spring 132 returns the pedal and restores the pedal-connected side link 112 in a clockwise direction to an out-of-the-way position.

Engine idling at low idle is accomplished by pushing the rack 50 in the manner described to the point at which the tooth of the pawl 76 seats in the idle setting notch 84, and engine shut-off accomplished by further depressing the rack 50 in the manner described into the dotted line shut-off position 50b. The corresponding engine shut-off position of the control link 20 is indicated by the broken lines 20b, FIGURE 1.

The rack 50 is so machined that if, and only if, the notch 84 is not occupied or latched by the pawl 76, a selected notch 82 can be latched by the pawl 72; therefore, the smooth rack portion 88 and the tooth of the pawl 76 cooperate when the rack occupies the broken line position 50c to unlatch the interengaged notch 82 and pawl tooth 72 by appropriate pivoting of the plate 58 clockwise as viewed in FIGURE 1.

In case and only in case none of the notches 82 is occupied by the tooth of the pawl 72, the single notch 84 can be occupied and latched by the tooth of the pawl 76; therefore in that case, the smooth rack portion 86 and the tooth of the pawl 72 cooperate when the rack 50 is displaced in the opposite direction to the broken line position 50b to pivot the plate into the broken line position 58a unlatching the tooth of the pawl 76 and the notch 84. In that case, the handle 64 can thereafter be fully depressed for engine shut-off.

What is claimed is:

1. An operator's device for controlling the speed setting of an engine fuel control comprising:
   a motion transmitting train having means of attachment to the control and including input linkage means;
   a rack operatively related to the train having a connection to said input linkage means of the train;
   means supporting the train and rack in the operative relationship described, said means both enabling the rack to be capable of limited transverse displacement, and including a console housing in respect to which the rack is set in axially adjusted positions; and
   means for axially latching said rack with respect to the housing in at least two predetermined positions whereby sliding motion of said rack from a push by the operator will cause said rack and control to move from a power range position to idle position, and transverse displacement of said rack by the operator when made in one direction will cause said rack to unlatch for said sliding motion, and when made in a different direction will cause said rack to unlatch for further sliding motion to an engine shut-off position.

2. The invention of claim 1, characterized by means to pivot the rack so as to transversely displace same in the respective unlatching directions aforesaid.

3. The invention of claim 2, the last said means characterized by:
   bell crank linkage means in the input linkage means by which said rack connection is made and on which the rack is pivotally mounted at one end; and
   means (64) operable at the free end by the operator to move the rack.

4. The invention of claim 3, the rack latching means characterized by:
   a latch plate with plural pawls, having a section of the rack intermediate the rack ends slidably received therein so that the pawls on the plate are mutually exclusively latched in receiving notch means in said intermediate rack section.

5. The invention of claim 4, the latching means further characterized by:
   means, including either one of the pawls not latched while another pawl remains latched, to pivot the plate into a position unlatching said other pawl from a rack notch; and
   means to restore the plate to the unpivoted position.

6. The invention of claim 5, the plate pivoting means characterized by:
   an upper smooth portion on the rack adjacent upper receiving notch means and a lower smooth portion on the rack adjacent lower receiving notch means;

an upper one of the pawls being engageable with the receiving notch means to latch said rack in a power setting, and engageable with the upper smooth portion to unlatch another pawl from the receiving notch means.

7. The invention of claim 5, the plate pivoting means characterized by:

lower receiving notch means (84) engageable by one pawl (76) to latch the rack in an idle setting and a smooth lower portion (88) on the intermediate rack section engageable by the one pawl to unlatch another pawl from notch means.

8. The invention of claim 5, the latching means further characterized by:

an upper pawl on the plate at one side of the pivot axis thereof and a lower pawl on the plate at the opposite side of said axis;

upper notch means and an upper smooth portion on the rack intermediate section engaging the upper pawl selectively to latch the upper pawl in a power range setting or to pivot the plate into a position unlatching the lower pawl from receiving notch means; and lower notch means and a lower smooth portion on the rack intermediate section engaging the lower pawl selectively to latch the rack in an idle setting or to pivot the plate into a position unlatching the upper pawl from the upper notch means.

9. The invention of claim 8, the upper and lower notch means respectively characterized by:

upper rack notches (82) selectable according to a series of power range settings and located in the plane of the upper smooth portion (86); and a single lower notch (84) constituting the lower receiving notch means and located in the plane of the lower smooth portion (88) and forming a single idle setting.

10. The invention of claim 5, the latching means further characterized by:

said restoring means to restore the plate and one of the pawls being connected to the plate each at the same side of the pivot axis thereof, another pawl being connected to the plate on the opposite side of said axis;

said pawls being rigid with and perpendicular to the latch plate.

11. The invention of claim 10, the means to restore the plate characterized by:

a biasing spring disposed between and operatively interconnecting the latch plate and the supporting means.

12. The invention of claim 1, characterized by:

said motion transmitting train including an output linkage providing said means of attachment to the control;

the input linkage means included in said train comprising primary and secondary input linkages, said output linkage having a separate connection to each of the input linkages for selective operation by either.

13. The invention of claim 12, the input linkage means characterized by:

the rack connection to the input linkage means comprising a connection on the primary input linkage on which the rack is pivotally mounted at one end; and a decelerator pedal;

the secondary input linkage having the decelerator pedal connected thereto and moving same into positions corresponding therewith, between and including a decelerator release position and a depressed decelerator position establishing engine fast idle.

14. The invention of claim 13, the output linkage characterized by:

a pedal-connected side link operated by the secondary input linkage;

a rack-connected side link operated by the primary input linkage; and a common link operatively between the side links, selectively operable thereby, and included in the means of attachment to the control.

15. The invention of claim 14, the output linkage further characterized by:

a separate overtravel connection between the common link and each of the selectively operable side links, enabling the common link to operate by traveling due to its connection with either side link in conjoint movement therewith upon being duly selected, while at the same time overtraveling another side link.

16. The invention of claim 15, the overtravel connections characterized by:

separate adjustment means in the connections for setting the engine idle from the pedal-connected side of the common link at one speed and from the rack-connected side of the common link at one speed.

17. The invention of claim 16, the overtravel connections further characterized by:

the adjustment means being independent and affording differing engine idle speeds.

18. The invention of claim 17, the engine idles characterized by:

a low idle speed setting from the rack-connected side of the common link and a high idle speed setting from the pedal-connected side of the common link.

19. The invention of claim 15, the output linkage thereof further characterized by:

a return spring (132) biasing the pedal-connected link into a position accommodating travel of the common link jointly with another side link without disturbing the pedal-connected side link or interfering with said joint travel.

20. The invention of claim 19, the output linkage thereof further characterized by:

a tension spring (121) yieldable to accommodate travel of the common link, jointly with a side link when the latter is selectively operated, without disturbing an unselected side link.

21. The invention of claim 5, the console housing characterized by:

a guard therefor; and means to pivot the guard into the path of the rack to to block extension of said rack from shut-off into the power range.

22. The invention of claim 21, the pivoted guard and latch plate characterized by:

a pivot common thereto and mounting same for pivotal movement relative to the console housing about a fixed generaly horizontal axis.

References Cited

UNITED STATES PATENTS 3,002,397    10/1961    Du Shane et al.    74—482
3,040,596    6/1962    Du Shane et al.    74—482

MILTON KAUFMAN, Primary Examiner